United States Patent
Castillo Rivera et al.

(10) Patent No.: US 9,150,432 B2
(45) Date of Patent: Oct. 6, 2015

(54) METHOD AND PLANT FOR THE TREATMENT OF WASTEWATER WITH A VIEW TO ELIMINATING THE ADVERSE ENDOCRINE EFFECT AND/OR THE TOXIC OR GENOTOXIC EFFECT THEREOF

(75) Inventors: Luis Castillo Rivera, Neuville sur Olse (FR); Cedric Feliers, Shanghai (CN); Florencio Martin, Aubervilliers (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 1224 days.

(21) Appl. No.: 13/054,184

(22) PCT Filed: Jul. 27, 2009

(86) PCT No.: PCT/EP2009/059679
§ 371 (c)(1),
(2), (4) Date: Mar. 10, 2011

(87) PCT Pub. No.: WO2010/012693
PCT Pub. Date: Feb. 4, 2010

(65) Prior Publication Data
US 2011/0259832 A1    Oct. 27, 2011

(30) Foreign Application Priority Data

Jul. 29, 2008  (FR) .................................... 08 55225

(51) Int. Cl.
*C02F 1/32*  (2006.01)
*C02F 1/78*  (2006.01)
*C02F 101/30*  (2006.01)

(52) U.S. Cl.
CPC ... *C02F 1/32* (2013.01); *C02F 1/78* (2013.01); *C02F 2101/305* (2013.01); *C02F 2209/21* (2013.01); *C02F 2209/23* (2013.01)

(58) Field of Classification Search
CPC ........ C02F 1/78; C02F 1/32; C02F 2101/305; C02F 2209/08; C02F 2303/04; C02F 2209/005; C02F 2209/21; C02F 2209/23; C02F 9/00; C02F 1/30; C02F 2305/023; C02F 2209/04; C02F 1/72; C02F 2201/78; C02F 2201/782; C02F 2203/00; C02F 2209/00; C02F 2209/001; C02F 2209/003; C02F 2305/02; B01D 2251/104
See application file for complete search history.

(56) References Cited

U.S. PATENT DOCUMENTS 5,798,047 A  *  8/1998  Tekawa .......................... 210/739
6,982,039 B1 *  1/2006  Butkus et al. ............... 210/748.1
(Continued)

FOREIGN PATENT DOCUMENTS

| EP | 1234802 | 8/2002 |
|---|---|---|
| JP | 2001 129572 | 5/2001 |
| KR | 20010078879 A * | 8/2001 ................ C02F 3/02 |

OTHER PUBLICATIONS

GasTran Injector System Commercial Brochure—BOD/COD Table on p. 4.*

(Continued)

*Primary Examiner* — Lucas Stelling
*Assistant Examiner* — Rohit K Dewan
(74) *Attorney, Agent, or Firm* — Coats and Bennett PLLC

(57) ABSTRACT

The instant application describes methods of treating wastewater containing pathogenic microorganisms to reduce the concentration of those pathogenic microorganisms. The methods include measuring parameters or qualities of the wastewater, and using those parameters or qualities to determine the wastewater's ozone demand. The wastewater is dosed with ozone, with the dosage being less than the ozone demand. The ozone and wastewater are mixed with a static mixer, and the wastewater is oxidized by the ozone. Thereafter, the wastewater is disinfected via ultraviolet radiation treatment. The instant application further relates to a wastewater treatment system. The system includes an ozone reactor with a static mixer, an ozone supply device, at least one sensor, and an ultraviolet radiation disinfection unit. The ultraviolet radiation disinfection unit is located downstream from the ozone reactor.

16 Claims, 3 Drawing Sheets

(56) References Cited

U.S. PATENT DOCUMENTS

2004/0168989 A1* 9/2004 Tempest, Jr. .................. 210/760
2011/0186495 A1* 8/2011 Robinson et al. .......... 210/198.1

OTHER PUBLICATIONS

KR-20010078879 A—Translated Abstract.*
KR-20010078879 A—Korean Machine Translation.*
Use of on-line UV/Vis-spectrometry in the measurement of dissolved ozone and AOC concentrations in drinking water treatment. Water Sci Technol. 2008;57(8):1169-75. van den Broeke J, Ross PS, van der Helm AW, Baars ET, Rietveld LC.*
Ozonation of a recirculating rainbow trout culture system, bullock, Mar. 11, 2006, accessed Aug. 27, 2014.*
Ozone in recirculating aquaculture, New South Wales Dept of Primary Industries (NSW), Sep. 13, 2007, accessed Aug. 27, 2014.*
GasTran Injector System Commercial Brochure—BOD/COD Table on p. 4 (date unknown).*
KR-20010078879 A—Translated Abstract—2001.*
KR-20010078879 A—Korean Machine Translation—2001.*
Gong et al.; "O3 and UV/O3 oxidation of organic constituents of biotreated municipal wastewater"; Water Research; 42 (2008) 1238-1244.
Yoshida et al.; "Decomposition of Endocrine Disrupters in Sewage Treated Water by Ozonation;" Kobelco Technology Review; No. 24, Oct. 2001; pp. 45-49.

* cited by examiner

METHOD AND PLANT FOR THE TREATMENT OF WASTEWATER WITH A VIEW TO ELIMINATING THE ADVERSE ENDOCRINE EFFECT AND/OR THE TOXIC OR GENOTOXIC EFFECT THEREOF

This application is a U.S. National Stage Application of PCT Application No. PCT/EP2009/059679, with an international filing date of 27 Jul. 2009. Applicant claims priority based on French Patent Application No. 0855225 filed 29 Jul. 2008. The subject matter of these applications is incorporated herein.

FIELD OF THE INVENTION

The field of the invention is that of the treatment of wastewater of both urban and industrial origin.

More specifically, the invention pertains to a method and plant for treating such water in order to combat and ideally eliminate the adverse endocrine effect and/or toxic effect and/or genotoxic effect and provide for the disinfection of this water through the elimination of pathogenic microorganisms.

PRIOR ART

The prior-art methods used to treat urban and/or industrial wastewater make it possible to degrade the essential part of the organic pollution contained in this water. However, most of the current methods are aimed at diminishing the concentration of the various organic compounds contained in this water without taking account of the possible production of byproducts of degradation. The residual organic compounds and such byproducts of degradation may have additive, synergistic or antagonistic biological effects which are not reflected by a simple value of their concentration in water.

Certain of these organic compounds, known as "endocrine disruptors" or "substances with adverse endocrine effects" have proved to be toxic for the exposed living species, especially aquatic organisms in environments that receive sewage plant effluents. These compounds consist of natural or man-made molecules which have hormone mimetic properties: they get bound with natural hormone receptors and thus interfere with one or more hormonal processes controlling for example behavior, protein synthesis, secretion, the transport of molecules, reproduction and other vital processes. Their toxic or even genotoxic effects may have an impact on the organism as well as the offspring of an exposed individual.

With a view to environmental conservation and, as a corollary, the conservation of human health, the elimination of this adverse endocrine effect and/or toxic and genotoxic effects in urban and/or industrial wastewater has become a major goal of methods for treating this water.

One of the goals of these treatments therefore is to eliminate organic matter. The disinfection processes generally performed as end-of-line treatments have, in addition to eliminating pathogenic microorganisms, extended the elimination of these organic substances to the utmost.

The prior art proposes various methods for water disinfection implementing chlorinated compounds, ozone, ultraviolet radiation etc.

In particular, the prior art proposes techniques of chemical oxidation implementing especially ozone, making it possible to eliminate both the micropollutant and the microorganism content.

The most common of these techniques use reactors in the form of contact columns (contactors) through which the water to be treated travels, these columns being provided at their base with porous elements enabling the diffusion in the water of air bubbles or ozonated oxygen.

In order to enable the efficient oxidation of the organic material, it is necessary to provide, in these columns, for a sufficiently lengthy contact time between the water to be treated and the ozone. Since the efficiency of mass transfer increases with the height of the column, the economically optimal useful height of such columns in practice is often about four to five meters.

To attain the health standards prescribed for making water drinkable or for shedding it into sensitive zones such as bathing or fishing areas, substantial doses of ozone need to be used. In practice, the ozone is diffused in the treated water at a treatment rate of 5 to 30 milligrams of ozone per liter depending on the quality of the effluent.

There are also known ways in the prior art of disinfecting water by using lamps that emit ultraviolet (UV) radiation at a wavelength ranging from 185 to 350 nm and more generally 254 nm. Such a use of UV rays (emitted by all types of radiation sources, especially lamps, light-emitting diodes, microwave or excimer technology) enable a sharp reduction in the microorganism content of the water, especially the content in pathogenic microorganisms (bacteria, viruses, unicellular organisms etc) but does not eliminate any adverse endocrine effect that may be present in wastewater. However, the efficiency of UV radiation is sharply limited for water to be treated showing high turbidity, related to the absorption of UV radiation by the medium and/or a reflection related to the presence of particles.

In order to improve the disinfecting effect of UV radiation, there are known ways of initially carrying out intensive oxidation by ozone to improve the quality of the water and thus increase the transmission of UV light (more specifically at 254 nm) of water, and then carry out UV irradiation to eliminate microorganisms that have withstood the action of the ozone.

In particular, the EP patent 1 320 513 B1 describes a water treatment method that couples a UV irradiation step with an ozone-based oxidation step that it follows, implementing low ozone content levels (between 0.1 and 15 $g/m^3$, and preferably between 5 and 10 $g/m^3$), the method in question being aimed at reducing the content in these waters of microorganisms and micropollutants considered to be endocrine disruptors.

This technique however has the drawback of requiring either the implementation of a sand filter between the means for injecting ozone into water and the UV irradiation device or ozonation columns, or the use of degassing means between said columns and the UV irradiation device to remove gas bubbles which, according to the authors, could harm the efficiency of the disinfection device.

The drawbacks of such ozone columns are that they are costly to implement and occupy substantial space.

Sand filters for their part have the drawbacks of being also bulky and needing to be regularly unclogged.

Such a method therefore calls for oversized structures that are costly, and consume energy and space.

GOALS OF THE INVENTION

The main goal of the invention is to propose a method for the deep elimination of micropollutants and more particularly for reducing the adverse endocrine effect and/or the toxic effect and/or the genotoxic effect provided by certain organic compounds or by the byproducts of their degradation and conversion, in overcoming the drawbacks related to high ozone treatment levels and the use of ozonation columns and a granular-type filtration step (using sand, coal, zeolite, peat etc).

In other words, it is one of the goals of the present invention to provide a compact method for treating waste water in which the operation for placing ozone in contact with the water to be treated does not give rise to any residual concentration of ozone detectable by existing measuring means. The treatment rate applied remains lower than the immediate ozone demand.

It is a goal of the present invention to describe a method of this kind which, concomitantly with a UV method, can be used to disinfect treated water, i.e. reduce its content in pathogenic microorganisms.

It is also a goal of the invention to provide a plant to implement a method of this kind making it possible, with high efficiency, to considerably reduce the size of civil engineering installations classically used to transfer ozone to water and for the degassing and filtering of ozonated water, or even to completely eliminate these installations.

It is another goal of the invention to provide a treatment plant with minimized time of contact of water with ozone, while enabling an efficient elimination of micropollutants or a conversion of these micropollutants to eliminate their adverse endocrine effect or toxic or genotoxic effect.

SUMMARY OF THE INVENTION

These goals are achieved by means of an urban and/or industrial wastewater treatment method intended to eliminate the adverse endocrine effect and/or the toxic effect and/or the genotoxic effect and to remove pathogenic microorganisms, including an ozone oxidation step and a disinfection step using UV radiation with a wavelength between 185 and 350 nm, with preferably a large part of the radiation at 254 nm, characterised in that said ozone oxidation step is performed in a static mixer with a small dose of ozone that is lower than the ozone demand of said water, in that said ozone oxidation step is immediately followed by said UV radiation disinfection step, and in that it includes a step of testing said ozone dose implemented in said water in said oxidation step, including the measurement of at least one parameter representing the quality of the water, which measurement is conducted on the water to be treated and/or on the water that has been subjected to said ozone oxidation step and prior to its disinfection by UV radiation, said step of testing said ozone dose being aimed at maintaining it between 0.05 and 0.5 milligram of ozone per milligram of the chemical oxygen demand (COD).

It will be noted, that in the context of the present description, the term "ozone demand" is understood to mean the ozone dose needed to meet the chemical needs for immediate oxidation of water enabling residual ozone to be obtained.

The use, according to such a method, of a low dose of ozone below the ozone demand of the water to be treated during the ozone oxidation step and the concomitant use of a testing step makes it possible to prevent the presence of residual ozone.

In the absence of such residual ozone authorized by such low doses, the method of the invention proposes to implement the step of oxidation by ozone by means of a static mixer. Such a plant has the advantage of being less costly and of taking up little space as compared with the space occupied by the ozonation columns while at the same time substantially reducing the necessary time of contact with these columns resulting from the rapid transfer of ozone from the gas phase to the liquid phase.

The use of ozone doses smaller than the ozone demand of water enables the partial oxidation of the organic matter contained in this water and especially the oxidation of the compounds likely to have an adverse endocrine effect and/or a toxic and/or a genotoxic effect and also make it possible to obtain water having improved UV transmission of said water at 254 nm, promoting the action of the ultraviolet radiation applied during the UV disinfection step.

As indicated here above, the use of a static mixer as an oxidation reactor accelerates the transfer between the ozone and the water, enabling low contact time as compared with methods implementing bubble columns.

One aspect of the method according to the invention is that it comprises a step for testing the ozone dose implemented in said water during said oxidation step.

This testing step preferably consists of the measurement of at least one physico-chemical parameter (COD, pH, conductivity, oxidoreduction potential, UV transmission at 254 nm etc.) representing the quality of the water and/or at least one biological parameter forming part of the adverse endocrine effect or toxic or genotoxic effect, by means of biological material (tadpoles, fish, prokaryotic or eukaryotic microorganisms, human or animal cell lines etc.).

Furthermore, a step for controlling the UV radiation dose during the disinfection step may also be planned. In the case of the disinfection step, the control parameter is of the physico-chemical type (UV transmission at 254 nm, turbidity, color etc) or optical type (radiometer to assess the UV dose).

These control steps are used to:

permanently maintain the ozone dose at a low level, below the ozone demand of this water and at least at the precise dose necessary to eliminate the adverse endocrine effect and/or toxic and/or genotoxic effect; and maintain the UV dose required to provide for the target disinfection efficiency.

The method of the invention is more compact than the methods proposed by the prior art (there is no need for gas-liquid transfer columns, degassing and filtration steps) and less costly to implement (low doses of ozone used and optimized UV irradiation doses, hence reduction of the energy needed to produce ozone and UV irradiation and no costs related to the devices described here above).

According to a one variant, said step of testing the ozone dose implemented in said water during said oxidation step includes the measurement of a parameter in the water to be treated and in the water already subjected to said oxidation step.

In such an instance, the testing step therefore includes measuring a parameter in the water to be treated, before it enters the static mixer, measuring this same parameter in the water coming out of said mixer and modifying the dispensed ozone dose accordingly.

According to one variant, said step of testing the UV radiation implemented in said water during said disinfection step includes the measurement of a parameter in the water to be treated and in the water already subjected to said disinfection step.

In such an instance, the testing step therefore consists in measuring a parameter in the water to be treated, before it enters the UV reactor, measuring this same parameter in the water coming out of said mixer and modifying the UV radiation dose applied accordingly.

According to a preferred variant, the parameters measured are the COD, the target biological effect and the UV radiation transmission of water at 254 nm. However, these parameters could be chosen from among other parameters (total or dissolved organic carbon, pH, conductivity, oxidoreduction potential, turbidity, color, optical measurement of the UV radiation dose (by radiometry), UV absorption etc.).

Also in a another variant, the step of testing the ozone dose and the UV radiation implemented in said water during said oxidation and disinfection steps are done automatically.

According to another aspect of the invention, the method also includes a step of testing the adverse endocrine and/or toxic and/or genotoxic effect, in which said testing step implements a biological sensor measuring at least one parameter representing said effects of the water to be treated on the one hand and of the water treated and/or of the water under treatment coming from said ozonation step on the other hand.

Again, in one embodiment, said step of testing said ozone dose is aimed at maintaining said ozone dose between 0.05 and 0.5 milligram of ozone per milligram of the COD and more specifically at 0.1 milligram of ozone per milligram of the COD.

Advantageously, the step of disinfection by UV radiation is implemented at a dose below 1000 $J/m^2$.

The invention also pertains to a plant for implementing this method, said plant including means for conveying water to be treated, means for conveying ozone, at least one ozonation reactor, at least one UV radiation disinfection unit and means for discharging the treated water, characterised in that said ozonation reactor is a static mixer, in that it includes:

means enabling the water coming from the static mixer to be routed directly to said UV disinfection unit or else to integrate said static mixer into the UV reactor; and at least one physico-chemical sensor enabling at least one physical or chemical parameter representing the content in oxidable matter (chemical oxygen demand for example) of the water to be treated and/or of the water leaving said static mixer.

Such a plant has the advantage of being far more compact than a prior-art plant implementing ozonation columns.

The use of a static mixer enables short contact time between water and ozone in this oxidation reactor and thus reduces the total time of contact between water and ozone using the plant. According to one interesting variant of the invention, the plant comprises means of automatic dosage of the ozone conveyed by said ozone-conveying means, said dosing means being linked to the physico-chemical sensor.

These automatic dosage means modify the ozone dose dispensed in the static mixer according to the results obtained during the measurement of the parameter representing the quality of the water to be treated and/or the quality of the water leaving said static mixer.

According to one variant, the physico-chemical sensor is a sensor indicating the content in oxidable and/or organic material (COD, TOC) and/or the transmission of UV radiation at 254 nm.

Again, according to another promising variant of the invention, said means for directly conveying the water coming from the ozonation reactor to said UV radiation disinfection unit and the means for discharging treated water are provided in a compact line according to the design called the "pipeline plant" design.

Such a characteristic enables an easy integration of this unit into existing structures.

Again, according to another interesting variant of the invention, the plant includes at least one biological sensor sensing at least one parameter representing the adverse endocrine and/or toxic and/or genotoxic effect of the water under treatment leaving said static mixer.

Preferably, said biological sensor is chosen from the group including biological sensors implementing tadpoles, fish, prokaryotic or eukaryotic microorganisms, human or animal cell lines.

The invention as well as its various advantages will be understood more clearly with reference to the following description of a non-restrictive embodiment given with reference to the appended drawings, of which:

Figure 1:
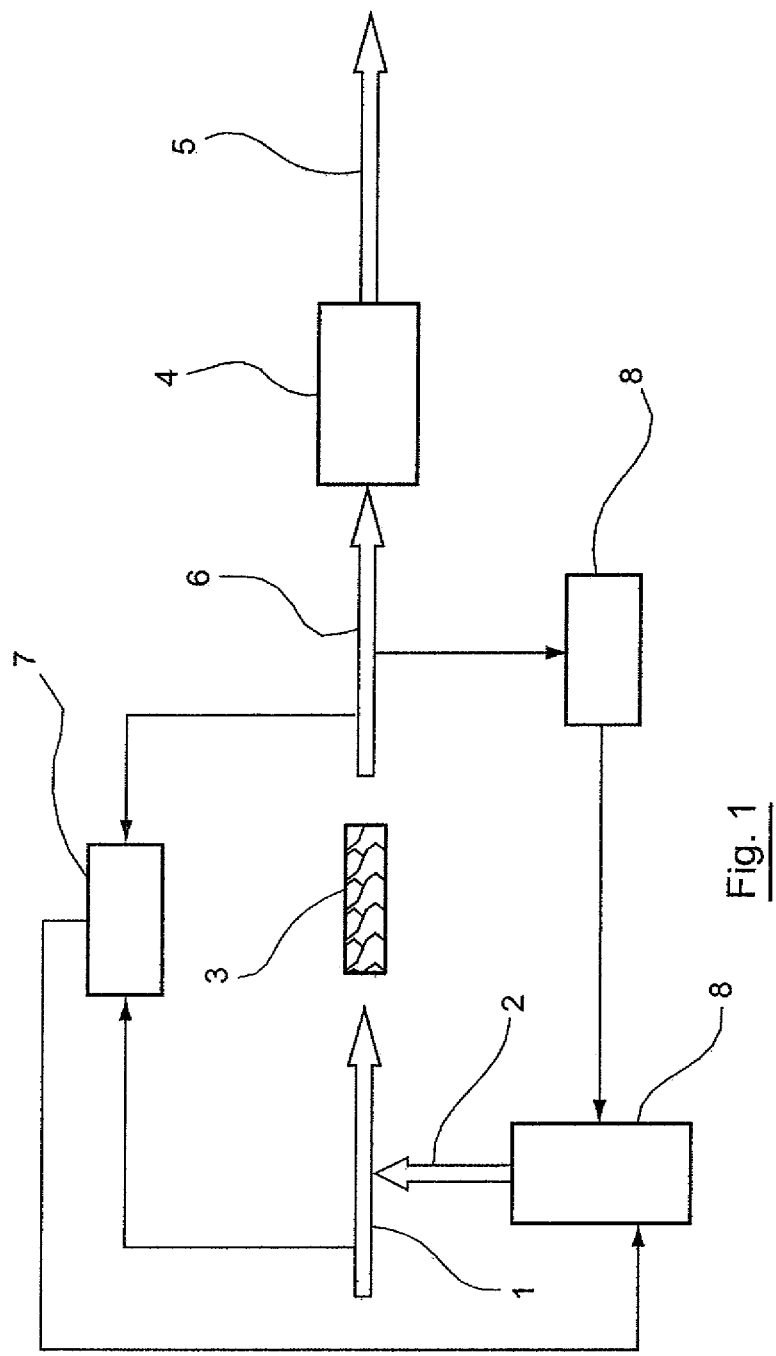
FIG. 1 is a schematic view of a plant according to the invention for the implementation of the method.

The plant shown in FIG. 1 comprises means 1 for conveying water to be treated. This water to be treated may be water that has already undergone a biological and/or chemical or physical purification treatment in a sewage plant (SP).

The plant furthermore comprises ozone conveying means 2, an oxidation reactor consisting of a static mixer 3, an UV radiation disinfection unit 4, means 5 for discharging treated water 5 and means 6 used to directly rout water from the static mixer to the UV disinfection unit 4. The means 5 and 6 include piping systems.

The invention also includes a physico-chemical sensor 7 indicating the COD, the TOC and/or UV transmission at 254 nm of water used to measure the turbidity of the water to be treated arriving by the water conveying means 1 and water going out of the static mixer travelling through the means 6 for directly conveying the water coming from the static mixer to the UV disinfection unit 4.

Thus, a test loop is set up to test the ozone dose used for the oxidation step of the method which makes it possible to maintain the ozone dose dispensed in water at 0.05 to 0.5 milligrams of ozone per milligram of COD.

The plant of the invention also includes a sensor 8 of adverse endocrine effects and/or toxic and/or genotoxic effects in the water coming from the static mixer. This sensor consists of a biological sensor using especially tadpoles, fishes, microorganisms or human or animal cell lines. This biological sensor is used to manually or automatically regulate the ozone dose in the ozone conveying means 2 if an excessively high adverse endocrine effect and/or toxic and/or genotoxic effect is observed by means of this biological sensor.

Three samples of a same body of water containing concentrations of molecules (17 β-Estradiol, 17 α-Estradiol, 17 α-Ethinylestradiol, Estrone) having a proven adverse endocrine effect were treated according to different types of treatment, namely:

oxidation treatment by ozone performed by means of a static mixer, using an ozone dose of 0.1 mg of ozone per mg of COD;

treatment by UV radiation alone implementing a dose of 400 $J/m^2$;

treatment according to the invention implementing a dose of 0.1 mg of ozone per mg of COD and UV radiation in a dose of 400 $J/m^2$.

Biological in vitro trials implementing HELN ERα cell models (having an estrogen receptor in configuration α) and HELN ERβ cell models (having an estrogen receptor in configuration β); as well as biological in vivo trials implementing amphibian models were performed. The results of these trials are collated in the following table 1.

TABLE 1

In vitro and in vivo biological assessment of the adverse endocrine effect before and after different treatments.

| | Adverse endocrine effect | | | | |
|---|---|---|---|---|---|
| | Thyroid axis | | Estrogen axis | | |
| Treatment | In vitro[a] | In vivo[b] | In vivo[b] | In vitro ERα[c] | In vitro ERβ[c] |
| SP outflow | + | + | + | + | + |
| SP outflow + O₃ | +/− | − | − | − | − |
| SP outflow + UV outflow | +/− | − | − | + | + |
| SP outflow + O₃ + UV | +/− | − | NA | − | − |

[a]Trials performed on rat-cultured astroglial cells (primary culture) following the type 2 de-iodinase activity (D2) in basic conditions or conditions activated by foskolin or TPA.
[b]Trials performed using *Xenopus laevis* larvae.
[c]Trials performed using HELN human cells transfected stably by ERα and ERβ response elements.
+: Adverse endocrine effect present.
+/−: Effect less important than in untreated water (but not absent).
−: Adverse endocrine effect absent.
NA: not available.

These results show that the samples of untreated water and samples of UV-treated water (with a 400 J/m2 dose) alone are positive in estrogen activity, i.e. they show that there is still an adverse endocrine effect and that the molecules responsible for the adverse endocrine effect are more active on ERα than on ERβ.

However, during ozone treatment or ozone and UV treatment according to the invention, there is no longer any adverse endocrine effect. Chemical analyses show results that confirm the fact that the molecules likely to induce said effect are far better neutralized through the invention. These results are given in table 2 here below.

TABLE 2

Chemical analysis (GC/MS-MS) of certain molecules with a proven adverse endocrine effect contained in water before and after different treatments.

| | Concentration (ng/L) | | | |
|---|---|---|---|---|
| Samples | 17β Estradiol | 17α Estradiol | Ethinylestradiol | Estrone |
| Water before treatment | 3.4 | <0.2 | 2.2 | 5.8 |
| UV treated water | 2.8 | <0.2 | 1.6 | 5.1 |
| O3 treated water | 0.2 | <0.2 | <0.4 | 0.3 |
| Water treated by O3 + UV according to the invention | <0.2 | <0.2 | <0.4 | 0.3 |

The concentrations in microorganisms (total coliforms, heat-tolerant coliforms, enterococci) at least some of which are pathogenic, of:

water before treatment (water flowing out of the sewage plant "SP outflow" and water constituted by a sample collected at outflow from SP over a period of 24 hours ("SP average outflow"), water after UV treatment ("SP outflow+UV");

water after treatment with ozone with a low dose smaller than the ozone demand of said water ("SP outflow+O3"); and water after treatment with a low dose below the ozone demand of said water and UV treatment according to the invention ("SP outflow O3/UV") according to the invention;

were measured.

Figure 2:
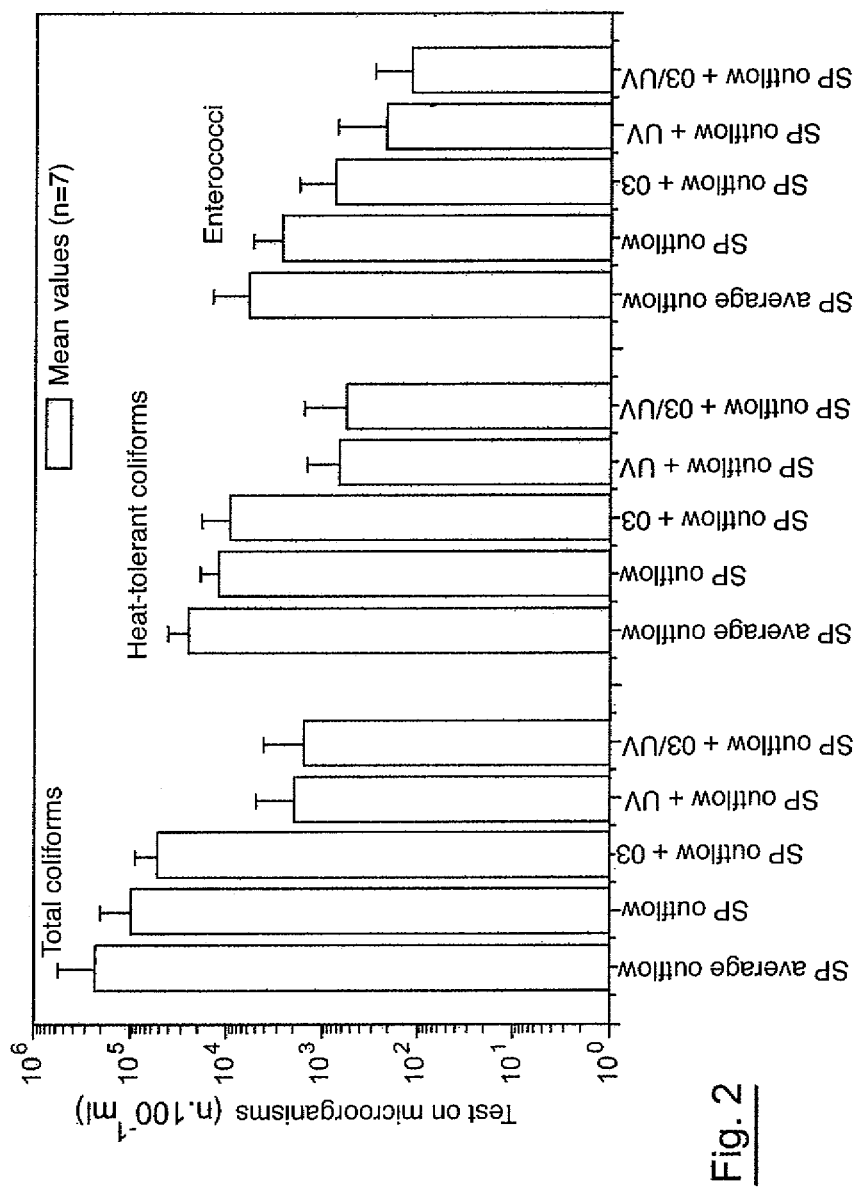
FIG. 2 is a graph showing UV radiation disinfection trials (400 $J/m^2$ dose) performed by the method of the invention.

The results of these measurements are shown in the graph according to FIG. 2. These results show that the invention improves the elimination of microorganisms, especially pathogenic ones.

Figure 3:
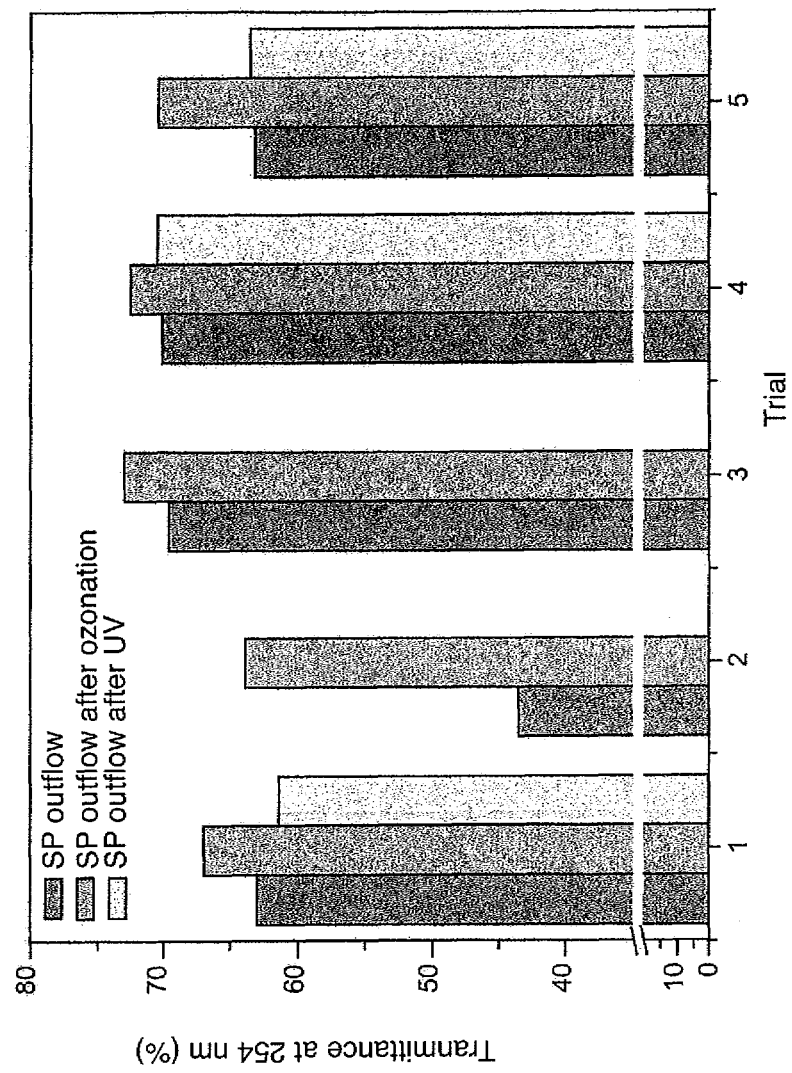
FIG. 3 is a graph of the UV radiation transmittance at 254 nm of the outflow of water coming from a sewage plant before and after treatment by ozonation or UV radiation (with a 10 mm optical path).

The transmittance values of:
water at outflow from the sewage plant ("SP outflow");
water after UV treatment ("SP outflow after UV"); and
water after treatment at a low dose below the ozone demand of said water ("SP outflow after ozonation")
were also measured. The results of these measurements are recorded in the graph according to FIG. 3. These results show an improvement of the UV transmittance after treatment of the water sample by ozone at a low dose below the ozone demand. This improvement of the UV transmittance through treatment with ozone explains the improvement in the elimination in microorganisms, especially pathogenic microorganisms, according to the invention.

The invention claimed is:

1. A method of treating wastewater having pathogenic microorganisms therein and generally reducing the concentration of pathogenic microorganisms in the wastewater, the method comprising:
    sensing one or more qualities of the wastewater;
    utilizing the one or more qualities to determine the ozone demand of the wastewater;
    dosing the wastewater with ozone, wherein the dose is less than the ozone demand such that the dosing is generally maintained between 0.05 and 0.5 milligrams of ozone per milligram of COD;
    mixing the ozone with the wastewater with a static mixer and oxidizing the wastewater with the ozone thereby providing a wastewater that is substantially free of residual ozone;
    after oxidizing the wastewater with ozone, disinfecting the wastewater by subjecting the wastewater to UV radiation with a wavelength between approximately 185 and approximately 350 nm; and
    wherein by oxidizing the wastewater with ozone and disinfecting the wastewater with UV radiation, the concentration of pathogenic microorganisms in the wastewater is reduced.

2. The method of claim 1 wherein sensing the quality of wastewater includes measuring at least one parameter representative of the quality of the wastewater.

3. The method of claim 2 wherein the parameter measured is a physicochemical parameter representing the quality of the water or a biological parameter indicating an adverse endocrine, toxic or genotoxic effect by utilizing a biological material.

4. The method of claim 1 wherein sensing one or more qualities of the wastewater includes measuring at least one parameter representing the quality of the wastewater and wherein the measurement of the parameter of the wastewater includes measuring the parameter before the ozone oxidation and after the ozone oxidation of the wastewater.

5. The method of claim 1, further including measuring at least one physicochemical or optical parameter representing the quality of the wastewater prior to the wastewater being subjected to UV radiation.

6. The method of claim 1, further including measuring a biological parameter indicating an adverse endocrine, toxic or genotoxic effect by utilizing biological material.

7. The method of claim 1 including dosing the wastewater at approximately 0.1 milligram of ozone per milligram of COD.

8. The method of claim 1 including disinfecting the wastewater by UV radiation at a dose below 1,000 J/m².

9. The method of claim 1 including dosing the wastewater at approximately 0.1 milligram of ozone per milligram of COD, and wherein the dose of UV radiation applied to the wastewater is below 1,000 J/m$^2$.

10. A method of treating water and reducing adverse endocrine, toxic and genotoxic effects in the water and reducing the concentration of pathogenic microorganisms, the method comprising:

measuring at least one parameter that is directly or indirectly representative of the COD in the water;

utilizing the parameter to determine the ozone demand of the wastewater;

directing the water to an ozone reactor having a static mixer;

oxidizing the water by dosing the water with ozone with an ozone dose less than the ozone demand of the wastewater such that the dosing is generally maintained between 0.05 and 0.5 milligrams of ozone per milligram of COD and utilizing the static mixer to mix the ozone with the water thereby providing a wastewater that is substantially free of residual ozone;

after the water has been oxidized with ozone, directing the water to a UV radiation disinfection unit; and treating the water by subjecting the water with UV radiation.

11. The method of claim 10 including utilizing a biological sensor to sense adverse endocrine, toxic or genotoxic effects in the water, and regulating the dosage of ozone based on the biological sensor sensing adverse endocrine, toxic or genotoxic effects in the water.

12. The method of claim 11 including dosing the ozone at approximately 0.1 milligram of ozone per milligram of COD.

13. The method of claim 11 including subjecting the water to UV radiation with a wavelength between 185 and 350 nm.

14. The method of claim 10 wherein measuring at least one parameter that is directly or indirectly representative of the COD in the water includes utilizing a sensor to measure the COD, TOC or the turbidity of the water.

15. The method of claim 14 including measuring the turbidity of the water with a UV radiation transmission at approximately 254 nm.

16. The method of claim 2 wherein measuring at least one parameter representative of the quality of the wastewater is performed automatically.

\* \* \* \* \*